US009471695B1

(12) United States Patent
Gallup et al.

(10) Patent No.: US 9,471,695 B1
(45) Date of Patent: Oct. 18, 2016

(54) SEMANTIC IMAGE NAVIGATION EXPERIENCES

(71) Applicant: Google Inc., Mountain View, CA (US)

(72) Inventors: David Robert Gallup, Bothell, WA (US); Ricardo Martin Brualla, Seattle, WA (US); Steven Maxwell Seitz, Seattle, WA (US)

(73) Assignee: Google Inc., Mountain View, CA (US)

( * ) Notice: Subject to any disclaimer, the term of this patent is extended or adjusted under 35 U.S.C. 154(b) by 5 days.

(21) Appl. No.: 14/558,092

(22) Filed: Dec. 2, 2014

(51) Int. Cl.
*G06F 17/30* (2006.01)
*G06F 3/0481* (2013.01)
(Continued)

(52) U.S. Cl.
CPC ......... *G06F 17/30873* (2013.01); *G01C 21/26* (2013.01); *G06F 3/0481* (2013.01); *G06F 3/04847* (2013.01); *G06F 17/30041* (2013.01); *G06F 17/30047* (2013.01); *G06F 17/30061* (2013.01); *G06F 17/3087* (2013.01); *G06F 3/0484* (2013.01); *G06F 17/3053* (2013.01); *G06F 17/30056* (2013.01); *G06F 17/30058* (2013.01); *G06F 17/30064* (2013.01); *G06F 17/30781* (2013.01); *G06F 2216/07* (2013.01); *G06K 9/00664* (2013.01);
(Continued)

(58) Field of Classification Search
CPC ........... G06F 3/0484; G06F 17/30873; G06F 17/3087; G06F 17/30047; G06F 17/30061; G06F 17/30058; G06F 17/30064; G06F 17/30241; G06F 17/30871–17/30858; G06F 17/30244–17/3028; G06F 17/3053; G06F 17/30056; G06F 17/30041; G06F 17/30598–17/30604; Y10S 707/918–707/921; G09B 29/008; G06T 19/00–19/003; G06T 17/05; G06T 2200/32; G06T 2200/24; G01C 21/26–21/36; G06K 9/00664–9/00704
See application file for complete search history.

(56) References Cited

U.S. PATENT DOCUMENTS 5,598,515 A * 1/1997 Shashua .................. 345/422
6,023,241 A * 2/2000 Clapper ................ 342/357.32
(Continued)

FOREIGN PATENT DOCUMENTS

CA 2270493 A1 * 11/1999 ............. H04L 12/16

OTHER PUBLICATIONS

O'Connor, Tim, "Make a 3D Photo Tour with Live Search Maps," published Apr. 15, 2008, Windows Live Photo & Video Blog: Official blog for the Windows Live Digital Memories Experience team, blogs.MSDN.com, accessed at http://blogs.msdn.com/b/pix/archive/2008/04/15/make-a-3d-photo-tour-with-live-search-maps.aspx, accessed on Jan. 18, 2015, 2 pages.*
(Continued)

*Primary Examiner* — Eric Wiener
(74) *Attorney, Agent, or Firm* — Lerner, David, Littenberg, Krumholz & Mentlik, LLP

(57) ABSTRACT

Aspects of the disclosure relate to generating a sequence of images or other visual representations associated with an entity, otherwise known as a semantic image navigation experience. After an entity is selected, a set of sub-entities may be identified. Each sub-entity in the set has a containment relationship with the selected entity as well as at least one associated landmark and one associated pre-stored navigation experience. Then, a ranking order of the sub-entities in the set may be determined based on characteristics of each entity. Based on the determined ranking order, a subset of sub-entities may be selected. A semantic image navigation experience for the selected entity may then be generated using the pre-stored navigation experiences associated with the subset of sub-entities.

20 Claims, 10 Drawing Sheets

(51) Int. Cl.
*G06F 3/0484* (2013.01)
*G01C 21/26* (2006.01)
*G09B 29/00* (2006.01)
*G06T 19/00* (2011.01)
*G06T 17/05* (2011.01)
*G06K 9/00* (2006.01)

(52) U.S. Cl.
CPC .............. *G06T 17/05* (2013.01); *G06T 19/00* (2013.01); *G06T 2200/24* (2013.01); *G06T 2200/32* (2013.01); *G09B 29/008* (2013.01); *Y10S 707/918* (2013.01)

(56) References Cited

U.S. PATENT DOCUMENTS

| | | | |
|---|---|---|---|
| 6,724,407 B1* | 4/2004 | Cheng | 715/848 |
| 6,914,626 B2* | 7/2005 | Squibbs | 348/231.3 |
| 7,353,114 B1* | 4/2008 | Rohlf et al. | 702/5 |
| 7,644,373 B2* | 1/2010 | Jing et al. | 715/838 |
| 7,712,052 B2* | 5/2010 | Szeliski et al. | 715/854 |
| 7,913,192 B2* | 3/2011 | Dicke et al. | 715/864 |
| 7,933,395 B1 | 4/2011 | Bailly et al. | |
| 8,060,510 B2* | 11/2011 | Ghanekar et al. | 707/736 |
| 8,131,118 B1* | 3/2012 | Jing et al. | 382/305 |
| 8,160,400 B2* | 4/2012 | Snavely et al. | 382/305 |
| 8,175,340 B2* | 5/2012 | Tsutsui | 382/113 |
| 8,392,430 B2* | 3/2013 | Hua et al. | 707/748 |
| 8,433,140 B2* | 4/2013 | Ke et al. | 382/209 |
| 8,451,319 B2* | 5/2013 | Kim et al. | 348/36 |
| 8,472,678 B2* | 6/2013 | Kim et al. | 382/113 |
| 8,533,187 B2* | 9/2013 | Brewington et al. | 707/723 |
| 8,578,300 B2* | 11/2013 | Relyea et al. | 715/848 |
| 8,639,023 B2* | 1/2014 | Kim et al. | 382/154 |
| 8,683,349 B2* | 3/2014 | Roberts et al. | 715/747 |
| 8,737,691 B2* | 5/2014 | Sivaraman | G01C 21/3476 382/104 |
| 2001/0015756 A1* | 8/2001 | Wilcock et al. | 348/158 |
| 2001/0017668 A1* | 8/2001 | Wilcock et al. | 348/552 |
| 2002/0062193 A1* | 5/2002 | Lin | 701/208 |
| 2003/0063133 A1* | 4/2003 | Foote et al. | 345/850 |
| 2003/0081010 A1* | 5/2003 | An Chang et al. | 345/835 |
| 2004/0078750 A1* | 4/2004 | Frank | 715/500 |
| 2004/0218894 A1* | 11/2004 | Harville et al. | 386/46 |
| 2004/0218895 A1* | 11/2004 | Samadani et al. | 386/46 |
| 2006/0104520 A1* | 5/2006 | Kraus et al. | 382/305 |
| 2006/0126944 A1* | 6/2006 | Loui et al. | 382/224 |
| 2006/0132482 A1* | 6/2006 | Oh | 345/419 |
| 2007/0078846 A1* | 4/2007 | Gulli et al. | 707/5 |
| 2007/0115373 A1* | 5/2007 | Gallagher et al. | 348/231.3 |
| 2007/0174269 A1* | 7/2007 | Jing et al. | 707/5 |
| 2007/0198182 A1* | 8/2007 | Singh | 701/211 |
| 2007/0258642 A1* | 11/2007 | Thota | 382/173 |
| 2008/0014964 A1* | 1/2008 | Sudit et al. | 455/456.1 |
| 2008/0016472 A1* | 1/2008 | Rohlf et al. | 715/848 |
| 2008/0086468 A1* | 4/2008 | Jing et al. | 707/5 |
| 2008/0086686 A1* | 4/2008 | Jing et al. | 715/706 |
| 2008/0129528 A1* | 6/2008 | Guthrie | 340/686.1 |
| 2008/0143727 A1* | 6/2008 | Oh et al. | 345/474 |
| 2008/0177793 A1* | 7/2008 | Epstein et al. | 707/104.1 |
| 2008/0215983 A1* | 9/2008 | Wierowski et al. | 715/723 |
| 2009/0031246 A1* | 1/2009 | Cowtan et al. | 715/786 |
| 2009/0083275 A1* | 3/2009 | Jacob et al. | 707/10 |
| 2009/0115785 A1* | 5/2009 | Grandhi et al. | 345/440 |
| 2009/0290812 A1* | 11/2009 | Naaman et al. | 382/305 |
| 2010/0042923 A1* | 2/2010 | Barcay et al. | 715/715 |
| 2010/0169838 A1* | 7/2010 | Szeliski | G06F 3/04815 715/848 |
| 2010/0290699 A1* | 11/2010 | Adam et al. | 382/155 |
| 2010/0303342 A1* | 12/2010 | Berg et al. | 382/155 |
| 2010/0312386 A1* | 12/2010 | Chrysanthakopoulos et al. | 700/246 |
| 2011/0006977 A1* | 1/2011 | Khosravy et al. | 345/156 |
| 2011/0059759 A1* | 3/2011 | Ban | 455/466 |
| 2011/0196897 A1* | 8/2011 | Koch et al. | 707/792 |
| 2012/0011129 A1* | 1/2012 | van Zwol et al. | 707/748 |
| 2012/0084000 A1* | 4/2012 | Wang et al. | 701/426 |
| 2012/0093411 A1* | 4/2012 | Tang et al. | 382/173 |
| 2012/0301014 A1* | 11/2012 | Xiao et al. | 382/159 |
| 2013/0051623 A1* | 2/2013 | Ofek et al. | 382/103 |
| 2013/0176321 A1* | 7/2013 | Mitchell et al. | 345/522 |
| 2014/0010405 A1* | 1/2014 | Sivaraman et al. | 382/103 |

OTHER PUBLICATIONS

Ai Gomi and Takayuki Itoh. 2011. A personal photograph browser for life log analysis based on location, time, and person. In Proceedings of the 2011 ACM Symposium on Applied Computing (SAC '11). ACM, New York, NY, USA, 1245-1251. DOI=10.1145/1982185.1982458 http://doi.acm.org/10.1145/1982185.1982458.*

Hideyuki Fujita and Masatoshi Arikawa. 2008. Animation of Mapped Photo Collections for Storytelling. IEICE—Trans. Inf. Syst. E91-D, 6 (Jun. 2008), 1681-1692. DOI=10.1093/ietisy/e91-d.6.1681 http://dx.doi.org/10.1093/ietisy/e91-d.6.1681.*

Mor Naaman, Yee Jiun Song, Andreas Paepcke, and Hector Garcia-Molina. 2004. Automatic organization for digital photographs with geographic coordinates. In Proceedings of the 4th ACM/IEEE-CS joint conference on Digital libraries (JCDL '04). ACM, New York, NY, USA, 53-62. DOI=10.1145/996350.996366 http://doi.acm.org/10.1145/996350.996366.*

Liliana Lo Presti and Marco La Cascia. 2014. Concurrent photo sequence organization. Multimedia Tools Appl. 68, 3 (Feb. 2014), 777-803. DOI=10.1007/s11042-012-1079-z http://dx.doi.org/10.1007/s11042-012-1079-z.*

Hideyuki Fujita and Masatoshi Arikawa. 2007. Creating animation with personal photo collections and map for storytelling. In Proceedings of the 2007 Euro American conference on Telematics and information systems (EATIS '07). ACM, New York, NY, USA, Article 1, 8 pages. DOI=10.1145/1352694.1352696 http://doi.acm.org/10.1145/1352694.1352696.*

Suporn Pongnumkul, Jue Wang, and Michael Cohen. 2008. Creating map-based storyboards for browsing tour videos. In Proceedings of the 21st annual ACM symposium on User interface software and technology (UIST '08). ACM, New York, NY, USA, 13-22. DOI=10.1145/1449715.1449720 http://doi.acm.org/10.1145/1449715.1449720.*

Zweig, Alon; Weinshall, D.; Exploiting Object Hierarchy: Combining Models from Different Category Levels; Computer Vision, 2007. ICCV 2007. IEEE 11th International Conference on; Oct. 14-21, 2007, Rio de Janeiro; pp. 1-8; DOI=10.1109/ICCV.2007.4409064.*

Noah Snavely, Rahul Garg, Steven M. Seitz, and Richard Szeliski. 2008. Finding paths through the world's photos. In ACM SIGGRAPH 2008 papers (SIGGRAPH '08). ACM, New York, NY, USA, Article 15, 11 pages. DOI=10.1145/1399504.1360614.*

Alexandar Jaffe, Mor Naaman, Tamir Tassa, and Marc Davis. 2006. Generating summaries and visualization for large collections of geo-referenced photographs. In Proceedings of the 8th ACM international workshop on Multimedia information retrieval (MIR '06). ACM, New York, NY, USA, 89-98. DOI=10.1145/1178677.1178692 http://doi.acm.org/10.1145/1178677.*

Alexandar Jaffe, Mor Naaman, Tamir Tassa, and Marc Davis. 2006. Generating summaries for large collections of geo-referenced photographs. WWW 2006, May 23-26, 2006; Edinburgh, Scotland; ACM 1-59593-323-9/06/0005. Retrieved from: http://infolab.stanford.edu/~mor/research/jaffeSummariesWWW06.pdf.*

Aditya Deshpande, Siddharth Choudhary, P. J. Narayanan, Krishna Kumar Singh, Kaustav Kundu, Aditya Singh, and Apurva Kumar. 2012. Geometry directed browser for personal photographs. In Proceedings of the Eighth Indian Conference on Computer Vision, Graphics and Image Processing (ICVGIP '12). ACM, New York, NY, USA, Article 2, 8 pages. DOI=10.114.*

Luca Chittaro, Roberto Ranon, and Lucio Ieronutti. 2003. Guiding visitors of Web3D worlds through automatically generated tours. In Proceedings of the eighth international conference on 3D Web

(56) References Cited

OTHER PUBLICATIONS technology (Web3D '03). ACM, New York, NY, USA, 27-38. DOI=10.1145/636593.636598 http://doi.acm.org/10.1145/636593.636598.*

Boris Epshtein, Eyal Ofek, Yonatan Wexler, and Pusheng Zhang. 2007. Hierarchical photo organization using geo-relevance. In Proceedings of the 15th annual ACM international symposium on Advances in geographic information systems (GIS '07). ACM, New York, NY, USA, , Article 18 , 7 pages. DOI=10.1145/1341012.1341036 http://doi.acm.org/10.1145/1341012.*

Schmitz, Patrick; Inducing Ontology from Flickr Tags; WWW 2006, May 22-26, Edinburgh, UK; Retrieved from: http://citeseerx.ist.psu.edu/viewdoc/download?doi=10.1.1.319.2816&rep=repl&type=pdf.*

Jiajian Chen, Jun Xiao, and Yuli Gao. 2010. iSlideShow: a content-aware slideshow system. In Proceedings of the 15th international conference on Intelligent user interfaces (IUI '10). ACM, New York, NY, USA, 293-296. DOI=10.1145/1719970.1720014 http://doi.acm.org/10.1145/1719970.1720014.*

Alex van Ballegooij and Anton Eli\&\#233;ns. 2001. Navigation by query in virtual worlds. In Proceedings of the sixth international conference on 3D Web technology (Web3D '01). ACM, New York, NY, USA, 77-83. DOI=10.1145/363361.363380 http://doi.acm.org/10.1145/363361.363380.*

Noah Snavely, Steven M. Seitz, and Richard Szeliski. 2006. Photo tourism: exploring photo collections in 3D. In ACM SIGGRAPH 2006 Papers (SIGGRAPH '06). ACM, New York, NY, USA, 835-846. DOI=10.1145/1179352.1141964 http://doi.acm.org/10.1145/1179352.1141964.*

Peter Dunker, Christian Dittmar, Andre Begau, Stefanie Nowak, and Matthias Gruhne. 2009. Semantic High-Level Features for Automated Cross-Modal Slideshow Generation. In Proceedings of the 2009 Seventh International Workshop on Content-Based Multimedia Indexing (CBMI '09). IEEE Computer Society, Washington, DC, USA, 144-149. DOI=10.1109/CBMI.2009.32.*

Miriam Redi. 2013. Semantic indexing and computational aesthetics: interactions, bridgesand boundaries. In Proceedings of the 3rd ACM conference on International conference on multimedia retrieval (ICMR '13). ACM, New York, NY, USA, 337-340. DOI=10.1145/2461466.2461532 http://doi.acm.org/10.1145/2461466.2461532.*

Krishna Chandramouli and Ebroul Izquierdo. 2010. Semantic structuring and retrieval of event chapters in social photo collections. In Proceedings of the international conference on Multimedia information retrieval (MIR '10). ACM, New York, NY, USA, 507-516. DOI=10.1145/1743384.1743472 http://doi.acm.org/10.1145/1743384.1743472.*

Pere Obrador, Rodrigo de Oliveira, and Nuria Oliver. 2010. Supporting personal photo storytelling for social albums. In Proceedings of the international conference on Multimedia (MM '10). ACM, New York, NY, USA, 561-570. DOI=10.1145/1873951.1874025 http://doi.acm.org/10.1145/1873951.1874025.*

Niklas Elmqvist, M. Eduard Tudoreanu, and Philippas Tsigas. 2007. Tour generation for exploration of 3D virtual environments. In Proceedings of the 2007 ACM symposium on Virtual reality software and technology (VRST '07), Stephen N. Spencer (Ed.). ACM, New York, NY, USA, 207-210. DOI=10.1145/1315184.1315224 http://doi.acm.org/10.1145/1315184.131522.*

Vogel, Julia; Schiele, Bernt; Semantic Modeling of Natural Scenes for Content-Based Image Retrieval; International Journal of Computer Vision—Apr. 2007, vol. 72, Issue 2, pp. 133-157; Date: Jul. 23, 2006; Retrieved from: http://link.springer.com/article/10.1007%2Fs11263-006-8614-1#.*

"Scope"; http://dictionary.reference.com/browse/scope; retrieved Aug. 2, 2015.*

Snavely, Noah, Steven M. Seitz, and Richard Szeliski. "Photo tourism: exploring photo collections in 3D." ACM transactions on graphics (TOG). vol. 25. No. 3. ACM, 2006.*

Crandall, David, and Noah Snavely. "Modeling people and places with internet photo collections." Communications of the ACM 55.6 (2012): 52-60.*

Charles, Jonathan; "Google Maps: 3D Photo Tours of Famous Landmarks Now Possible;" mobilenapps.com; posted Apr. 26, 2012; Archive.org date: Apr. 27, 2012; retrieved from: https://web.archive.org/web/20120427222112/http://www.mobilenapps.com/articles/1849/20120426/google-maps-3d-photo-tours-famous-landmarks.htm.*

Seitz, Steve; "Visit global landmarks with photo tours in Google Maps"; google-latlong blog; posted: Apr. 25, 2012; Apr. 28, 2012; retrieved from: Archive.org date: https://web.archive.org/web/20120428082810/http://google-latlong.blogspot.co.uk/2012/04/visit-global-landmarks-with-photo-tours.html.*

"Storytelling with maps using Tour Builder"; Google Earth Outreach; Archive.org date: Nov. 18, 2013; retrieved from: https://web.archive.org/web/20131118065852/http://www.google.com/earth/outreach/tutorials/tourbuilder.html.*

Lawrence, Nate; "Photo Tourism: Exploring photo collections in 3D" Vimeo video; 5:31 length; 2012; retrieved from: https://vimeo.com/30584674 on Oct. 13, 2015.*

Chen et al., "iSlideShow: A Content-aware Slideshow System", Proceedings of the 15th international conference on Intelligent user interfaces (Abstract provided).

Dunker et al., "Semantic High-Level Features for Automated Cross-Modal Slideshow Generation", Jun. 2009 (Abstract provided).

Fujita et al., "Animation of Mapped Photo Collections for Storytelling", IEICE Transactions on Information and Systems, vol. E91-D, No. 6, Jun. 1, 2008 (Abstract provided).

Fujita et al., "Animation of Mapped Photo Collections for Storytelling", IEICE Transactions, Jan. 2008 (Abstract provided).

Fujita et al., "Creating Animation with Personal Photo Collections and Map for Storytelling", EATIS '07 Proceedings of the 2007 Euro American conference on Telematics and information systems, 2007 (Abstract provided).

Fujita et al., "User Study of a Map-Based Slideshow Editor", University of Toronto Press, Apr. 29, 2011.

Kushal et al., "Photo Tours", IEEE Computer Society, Oct. 13, 2012.

Snavely et al., "Modeling the World from Internet Photo Collections", Int J Comput Vis, 2007.

* cited by examiner

700

SEMANTIC IMAGE NAVIGATION EXPERIENCES

BACKGROUND

Short movies depicting a place by showing user photographs with three-dimensional (3D) transitions between them have been created to provide coherent, informative, and efficient visualizations of real scenes. Thus far, these photo tours have shown one entity, like a famous church, from a variety of viewpoints. However, not much information besides the name of the landmark can easily be gleaned by viewers. In addition, photo tours often cannot be made for entities that cannot be captured easily by a user photograph.

SUMMARY

Aspects of the disclosure provide a method for generating semantic image navigation experiences. The method includes selecting, by one or more computing devices, a first entity; identifying, by the one or more computing devices, a set of sub-entities, each sub-entity in the set of sub-entities having a containment relationship with the first entity; filtering, by the one or more computing devices, the set of sub-entities to remove each entity that is not associated with at least one landmark and a pre-stored navigation experience for the at least one landmark associated with that entity; determining, by the one or more computing devices, a ranking order of the sub-entities in the filtered set of sub-entities based at least in part on one or more characteristics of each entity in the filtered set of sub-entities; selecting, by one or more computing devices, a subset of sub-entities based on the ranking order; and generating, by the one or more computing devices, a semantic image navigation experience for the first entity based on at least the pre-stored navigation experiences associated with the subset of sub-entities.

In one example, the method for generating the semantic image navigation experience includes receiving, by the one or more computing devices, a request from a client computing device; and sending, in response to the request, by the one or more computing devices, the semantic image navigation experience for the first entity to the client computing device. In another example, generating the semantic image navigation experience includes selecting, by the one or more computing devices, a set of images from each pre-stored navigation experience of the subset of sub-entities; and including, by the one or more computing devices, the selected set of images in the semantic image navigation experience as a sequence of images based on the ranking order. In this example, generating the semantic image navigation experience includes selecting, by the one or more computing devices, a set of images from a pre-stored navigation experience for the first entity; and inserting, by the one or more computing devices, the set of images from the pre-stored navigation experience for the first entity at a beginning of the semantic image navigation experience for the first entity. In yet another example, the ranking order is determined based on at least a landmark popularity metric. In another example, generating the semantic image navigation experience also includes including, by the one or more computing devices, information about each sub-entity in the subset of sub-entities. In another example, identifying the set of sub-entities includes clustering, by the one or more computing devices, a set of images of the first entity into subsets of images based on at least common features found in the images in the set of images; and defining, by the one or more computing devices, each subset of images as landmarks of a sub-entity of the first entity.

Other aspects of the disclosure provide a system comprising one or more computing devices. The one or more computing devices are configured to select a first entity; identify a set of sub-entities, each sub-entity of the set of sub-entities having a containment relationship with the first entity; filter the set of sub-entities to remove each entity that is not associated with at least one landmark and a pre-stored navigation experience for the at least one landmark associated with that entity; determine a ranking order of the sub-entities in the filtered set of sub-entities based at least in part on one or more characteristics of each entity in the filtered set of sub-entities; select a subset of sub-entities based on the ranking order; and generate a semantic image navigation experience for the first entity based on at least the pre-stored navigation experiences associated with the subset of sub-entities.

In one example, the one or more computing devices are also configured to receive a request from a client computing device; and send, in response to the request, the semantic image navigation experience for the first entity to the client computing device. In another example, the one or more computing devices are also configured to generate the semantic image navigation experience by selecting a set of images from each pre-stored navigation experience of the subset of sub-entities; and including the selected set of images in the semantic image navigation experience as a sequence of images based on the ranking order. In this example, the one or more computing devices are also configured to generate the semantic image navigation experience by selecting a set of images from a pre-stored navigation experience for the first entity; and inserting the set of images from the pre-stored navigation experience for the first entity at a beginning of the semantic image navigation experience for the first entity. In yet another example, the ranking order is determined based on at least a landmark popularity metric. In another example, the one or more computing devices are also configured to generate the semantic image navigation experience by including information about each sub-entity in the subset of sub-entities. In another example, the one or more computing devices are also configured to identify the set of sub-entities by clustering a set of images of the first entity into subsets of images based on at least common features found in the images in the set of images; and defining each subset of images as landmarks of a sub-entity of the first entity.

Further aspects of the disclosure provide a non-transitory, tangible machine readable medium on which instructions are stored. The instructions, when executed by one or more processors, cause the one or more processors to perform a method. The method includes selecting a first entity; identifying a set of sub-entities, each sub-entity of the set of sub-entities having a containment relationship with the first entity and being associated with at least one landmark and a pre-stored navigation experience for the at least one landmark associated with that sub-entity; filtering the set of sub-entities to remove each entity that is not associated with at least one landmark and a pre-stored navigation experience for the at least one landmark associated with that entity; determining a ranking order of the sub-entities in the filtered set of sub-entities based at least in part on one or more characteristics of each entity in the filtered set of sub-entities; selecting a subset of sub-entities based on the ranking order; and generating a semantic image navigation experience for the first entity based on at least the pre-stored navigation experiences associated with the subset of sub-entities.

In one example, the method also includes receiving a request from a client computing device; and sending, in response to the request, the semantic image navigation experience for the first entity to the client computing device. In another example, the method also includes generating the semantic image navigation experience by selecting a set of images from each pre-stored navigation experience of the subset of sub-entities; and including the selected set of images in the semantic image navigation experience as a sequence of images based on the ranking order. In this example, the method also includes generating the semantic image navigation experience by selecting a set of images from a pre-stored navigation experience for the first entity; and inserting the set of images from the pre-stored navigation experience for the first entity at a beginning of the semantic image navigation experience for the first entity. In yet another example, the method further comprises generating the semantic image navigation experience by including information about each sub-entity in the subset of sub-entities. In another example, the method also includes identifying the set of sub-entities by clustering a set of images of the first entity into subsets of images based on at least common features found in the images in the set of images; and defining each subset of images as landmarks of a sub-entity of the first entity.

GLOSSARY

Figure 1:
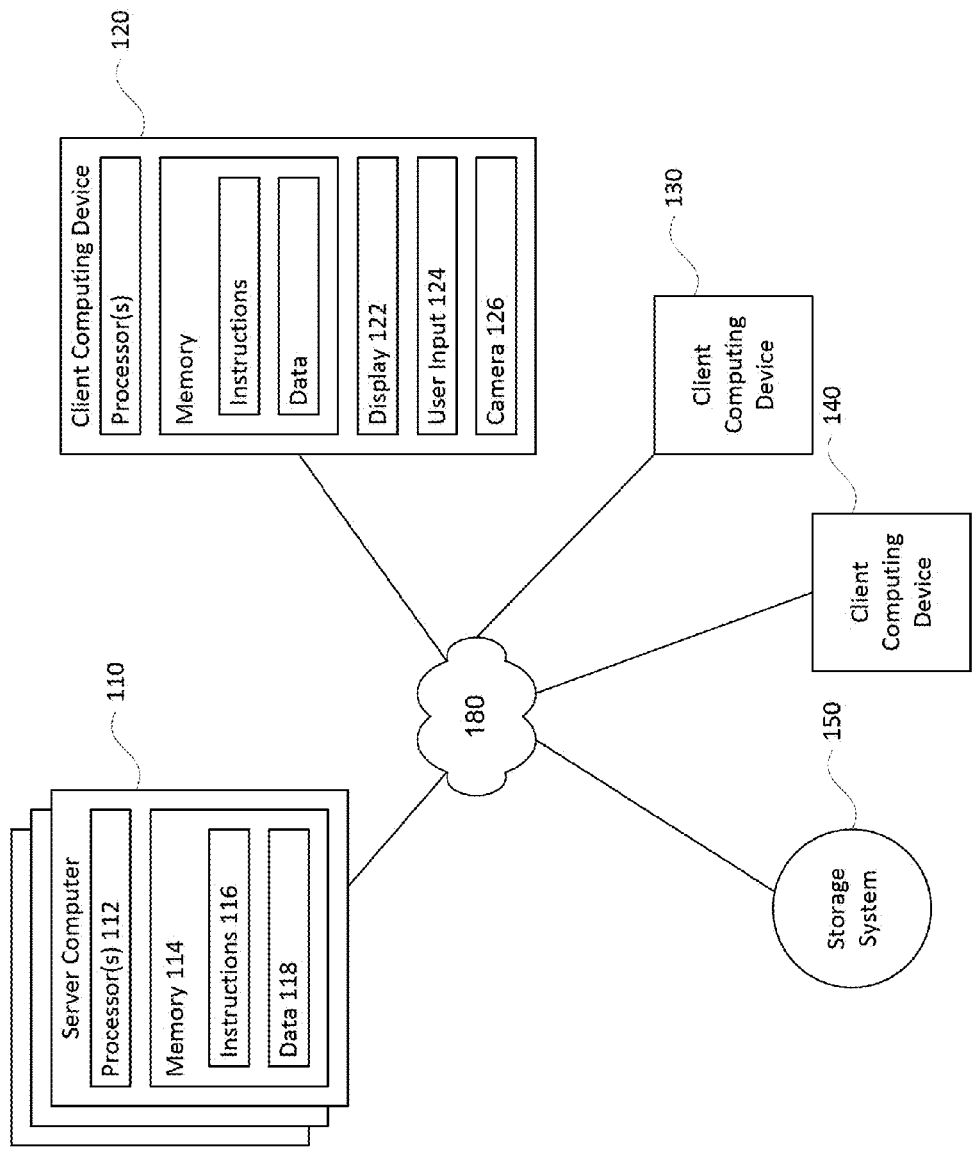
FIG. 1 is a functional diagram of an example system in accordance with aspects of the disclosure.

Entity—a person, place, thing, or concept.
Containment relationship—a relationship between two entities where an entity having a smaller scope falls within the larger scope of another entity.
Sub-entity—an entity having the smaller scope in a containment relationship.
Parent entity—an entity having the larger scope in a containment relationship.
Geographic entity—an entity that has a geographical scope.

Geographic containment relationship—where a geographic entity having a smaller geographical scope falls within the larger geographical scope of another geographic entity.
Geographic sub-entity—a geographic entity having the smaller geographical scope in a geographic containment relationship.
Geographic parent entity—a geographic entity having the larger geographical scope in a geographic containment relationship.
Landmark—a visual representation, such as a representative image or video, of an entity.
Navigation experience—a sequence of images and information for displaying the images as a photo tour.
Semantic image navigation experience a navigation experience generated from at least two or more previously generated or pre-stored navigation experiences.

DETAILED DESCRIPTION OVERVIEW

The technology relates to creating and providing semantic image navigation experiences. Each semantic image navigation experience may include "playing" a sequence of images related to a set of entities. In this regard, a user may use a client computing device to request and view a semantic image navigation experience for a given entity. When displayed to the user on the client computing device, the images of the semantic image navigation experience are displayed in sequence as a tour moving between entities of the set. In addition, 3D transitions may be used between images to give the tour a realistic feel as if the user were walking through the images. In some examples, various annotations for the displayed images may be displayed as well.

In order to generate such semantic image navigation experiences, a knowledge graph, which includes structured information about the world in general, may be used. The knowledge graph may identify entities and containment relationships. An entity is a person, place, thing, or concept and can thus be an individual, proper name, group, city, object, theory, or other general idea. An entity may be associated with any number of sub-entities having a containment relationship with the entity. This containment relationship is defined as a relationship between two entities where an entity having a smaller scope falls within the larger scope of another entity. The entity having the smaller scope in the containment relationship is therefore the sub-entity, and the entity having the larger scope is the parent entity.

Some entities may be geographic entities, i.e., entities that have a geographical scope. A geographic entity may be associated with any number of geographic sub-entities having a geographic containment relationship with the geographic entity. In this regard, a geographic sub-entity is a geographic entity having a smaller geographical scope that falls within the larger geographical scope of another geographic entity, here a geographic parent entity.

Some entities may not have any associated sub-entities. On the other hand, some entities may have multiple levels of nesting of sub-entities. In other words, some entities may have sub-entities that have their own sub-entities. The nested sub-entities have containment relationships with all the entities in which they are nested.

The knowledge graph may also relate entities to landmarks. A landmark is a visual representation of an entity, such as a representative image or a video. To determine what may be a landmark, clustering algorithms may be used. At least some entities in the knowledge graph may not have associated landmarks.

Those entities in the knowledge graph having an associated landmark may also be associated with a navigation experience. Each of these navigation experiences are a sequence of images and information for displaying the images as a photo tour. Some navigation experiences, such as those for a respective entity, may correspond to the one or more landmarks associated with the respective entity. These navigation experiences may be generated using any known technique, including automatically or manually by an operator, and may be pre-stored.

In order to generate a semantic image navigation experience for a first entity, sub-entities of the first entity may be identified using the knowledge graph. Together, the first entity and the sub-entities may form a set of entities. In addition to the sub-entities, any landmarks associated with the first entity and the sub-entities may be identified using the knowledge graph. This may also be done for a geographic entity and its associated geographic sub-entities.

The set of entities may be filtered to remove any entities that do not have an associated landmark and a pre-stored navigation experience. The entities in the filtered set of entities may be ranked. The ranking may be based on one or more landmark popularity metrics.

The semantic image navigation experience for the first entity may be created by selecting a first group of images from the pre-stored navigation experiences of the filtered set of entities. The first group of images from the pre-stored navigation experience of the first entity may be placed in the beginning of the semantic image navigation experience for the first entity. Then, the first group of images from the pre-stored navigation experience of the highest ranked sub-entity in the filtered set of entities may be placed in the semantic image navigation experience, followed by the first group of images from the pre-stored navigation experience of the second ranked sub-entity in the filtered set of entities. There may be transitions between the groups of images.

As noted above, a user may use a client computing device to request and view the semantic image navigation experiences. The user may enter a request identifying a particular entity. In response to a request from a user from a client computing device, a semantic image navigation experience may be sent to the client device for display. Information and instructions included in the semantic image navigation experience may also be sent to be displayed alongside the images on the user device.

In some alternatives, a navigation experience may be created for an entity with sub-entities that are not associated with any landmarks already associated with the entity. For example, some features within entities do not appear in images in isolation frequently enough for them to be automatically recognized as separate visual entities. As a result, the images are recognized in the knowledge graph as landmarks for the larger parent entity, but do not associate them with the appropriate sub-entity. In order to address this, the one or more landmarks for the entity may be segmented into clusters of landmarks based on different features. This may be accomplished through use of a clustering technique which may consider information such as what features are of importance within an entity. Then, by assigning each cluster of landmarks depicting a particular sub-entity to that particular sub-entity, a semantic image navigation experience may be created as described herein.

In some other alternatives, a navigation experience may be created for an entity with no pre-defined sub-entities. In order to address this, the one or more images or landmarks for the entity may be segmented into clusters of images or landmarks based on different features. This may be accomplished through use of a clustering technique which may consider information such as what features are of importance within an entity. Then, the entity with no pre-defined sub-entities may be treated as a first entity. The clusters of images may be treated as landmarks for respective sub-entities and/or the clusters of landmarks as landmarks for respective sub-entities. A semantic image navigation experience may then be created as described herein.

EXAMPLE SYSTEMS

Figure 2:
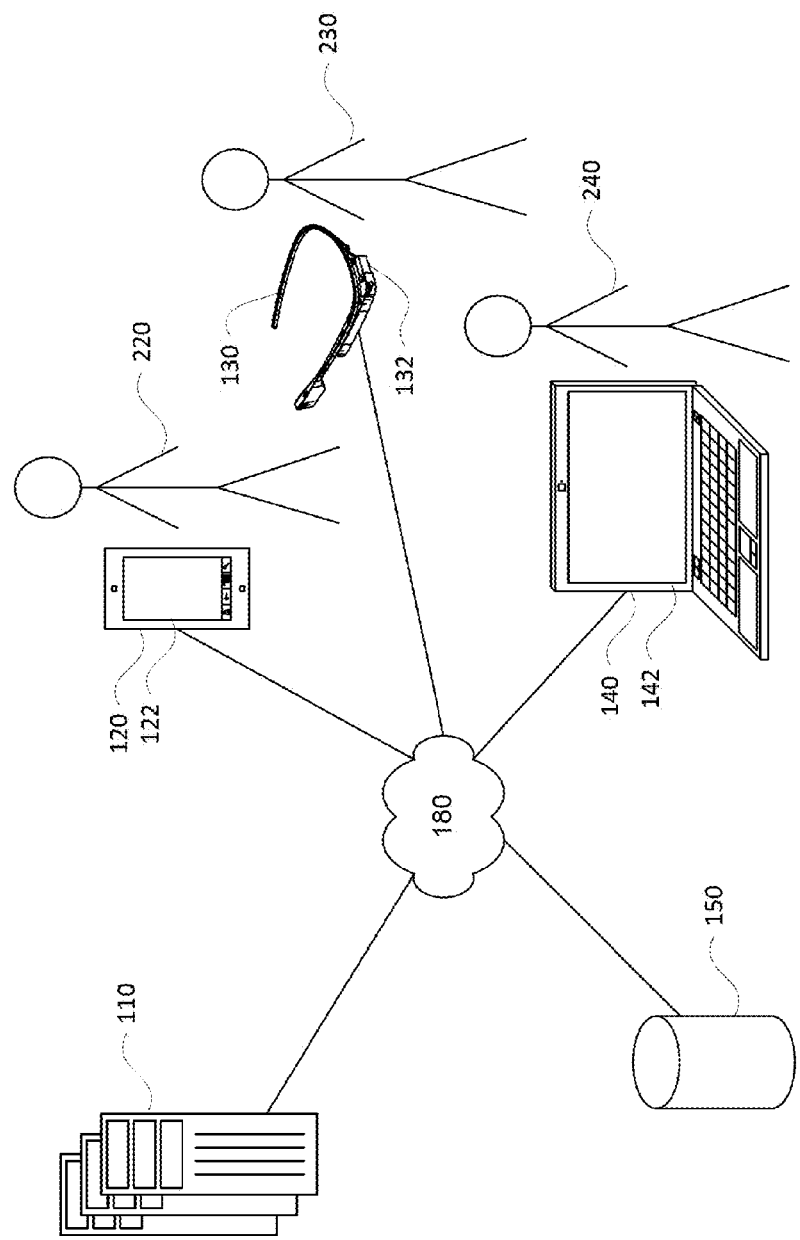
FIG. 2 is a pictorial diagram of the example system of FIG. 1.

FIGS. 1 and 2 include an example system 100 in which the features described herein may be implemented. It should not be considered as limiting the scope of the disclosure or usefulness of the features described herein. In this example, system 100 can include one or more computing devices 110, 120, 130, and 140, as well as storage system 150. One or more computing devices 110 can contain one or more processors 112, memory 114 and other components typically present in general purpose computing devices. Memory 114 of the one or more computing devices 110 can store information accessible by one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or structured (e.g., XML documents). The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as a commercially available CPU. Alternatively, the processor can be a dedicated component such as an ASIC or other hardware-based processor. Although not necessary, one or more computing devices 110 may include specialized hardware components to perform specific computing processes, such as decoding video, matching video frames with images, distorting videos, encoding distorted videos, etc. faster or more efficiently.

Although FIG. 1 functionally illustrates the processor(s), memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in one or more housings different from those of the one or more computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 180.

The one or more computing devices 110 can be at various nodes of a network 180 and capable of directly and indirectly communicating with other nodes of network 180. Although only a few computing devices are depicted in FIGS. 1-2, it should be appreciated that a typical system can include a large number of connected computing devices, with each different computing device (as well as collection device) being at a different node of the network 180. The network 180 and intervening nodes described herein can be interconnected using various protocols and systems, such that the network can be part of the Internet, World Wide Web, specific intranets, wide area networks, or local networks. The network can utilize standard communications protocols, such as Ethernet, Wi-Fi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, the one or more computing devices 110 may include one or more web servers that are capable of communicating with storage system 150 as well as computing devices 120, 130, and 140 via the network. For example, one or more server computing devices 110 may use network 180 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described below.

Each of the client computing devices may be configured similarly to the server computing devices 110, with one or more processors, memory and instructions as described above. Each client computing device 120, 130 or 140 may be a personal computing device intended for use by a user 220, 230, 240, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch-screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

Storage system 150 may store various types of information. As described in more detail below, the storage system 150 may store various formats of visual media, such as images or videos. Some images or and videos may be part of a sequence in a navigation experience, which may also be stored on storage system 150. These images or videos may be part of image files that are associated with other information, such as an image identifier that can be used to retrieve the image, the time the image was created, where the image was taken, from what angle the image is being viewed, and image format (JPEG, TIFF, etc.). The image file may contain a timestamp with information such as a date and the time of when the image was captured. The image file may also contain pose information including geographic location information indicating the location (such as latitude and longitude or other location coordinates), and orientation information (pose) at which the image was captured.

Storage system 150 may store 3D geometry data and algorithms for analyzing and manipulating images or videos. 3D geometry data may correspond to points on the surface of any objects in the images of storage system 150.

The storage system 150 may also store a knowledge graph that contains general information about the world. This information may include entities, containment relationships, and landmarks as discussed in further detail below. Entities are nouns or phrases. For instance, "Seattle," "Washington State," "Google," "Leonardo da Vinci," and "happiness" may each be an entity.

One entity may have a containment relationship with another entity. A containment relationship is when an entity having a smaller scope falls within the larger scope of another entity. In a containment relationship, an entity may be either a sub-entity or a parent entity. A sub-entity is an entity having the smaller scope in a containment relationship, and a parent entity is an entity having the larger scope in a containment relationship. For example, the "Leonardo da Vinci" entity may be a parent entity to the "Mona Lisa" entity, its sub-entity, because the Mona Lisa is one of Leonardo da Vinci's creations.

Certain entities may be geographic entities, or entities having a geographical scope. For example, the "Seattle" entity is a geographic entity since it has a geographical scope, the city border. Geographic entities may be in containment relationships called geographic containment relationships, where a geographic entity having a smaller geographical scope falls within the larger geographical scope of another geographic entity. In a geographic containment relationship, a geographic sub-entity is the geographic entity having the smaller geographical scope in a geographic containment relationship, and a geographic parent entity is the geographic entity having the larger geographical scope in a geographic containment relationship. In this regard, "Seattle" entity may be the parent entity to the following geographic sub-entities: "Space Needle," "Pike's Place Market," "Safeco Field," and "Seattle Public Library."

Some entities may be neither a sub-entity nor a parent entity, having no containment relationship with any other entity. On the other hand, some entities may have multiple containment relationships having levels of nesting of sub-entities. As discussed above, the "Seattle" entity may have a variety of sub-entities; however, the "Seattle" entity itself may also be a geographic sub-entity of the "Washington State" entity. A nested sub-entity has containment relationships with all the entities in which they are nested. For example, the "Space Needle" may have geographic containment relationships with both "Seattle" and "Washington State." The knowledge graph may include any number of nesting levels.

As noted above, the knowledge graph may also include landmarks. Landmarks are visual representations, such as a representative images or videos, of an entity. For example, a landmark associated with "Seattle" may be an image or video of the Seattle skyline. A visual representation may also be associated with information such as size, shapes, orientation information, and 3D points. A single entity may be associated with zero, one or more landmarks. A landmark for the "Space Needle" entity may be an image of a certain viewpoint of the Space Needle. As noted above, some entities in the knowledge graph (e.g., "happiness", "George Washington") may not have associated landmarks. Landmarks may be determined through using clustering algorithms to group a plurality of images, videos, and/or any other form of visual media based certain criteria, such as common features.

Those entities in the knowledge graph having an associated landmark may also be associated with a navigation experience, though some entities may have associated landmarks but no associated navigation experience. A navigation experience for a respective entity may correspond to one of the landmarks associated with the respective entity. For example, the landmark "Space Needle" may be associated with a navigation experience including a sequence of images of the Space Needle taken from different angles and distances and at different dates and times, with 3D transitions creating a path from one image to another. The navigation experience may also be associated with additional information such as the entity associated with the landmark, the location of the entity, and other facts about the entity. These navigation experiences may be generated using any known technique, including automatically or manually by an operator, and may also be pre-stored.

Some navigation experiences are semantic image navigation experiences. A semantic image navigation experience is generated from at least two or more previously generated or pre-stored navigation experiences. The semantic image navigation experiences may also be stored on storage system 150. The method for generating semantic image navigation experiences will be discussed further below.

As with memory 114, storage system 150 can be of any type of computerized storage capable of storing information accessible by server 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 180 as shown in FIG. 1 and/or may be directly connected to or incorporated into any of the computing devices 110-140 (not shown).

EXAMPLE METHODS

In addition to the operations described above and illustrated in the figures, various operations will now be described. The following operations do not have to be performed in the precise order described below. Rather, various steps can be handled in a different order or simultaneously, and steps may also be added or omitted.

Figure 3:
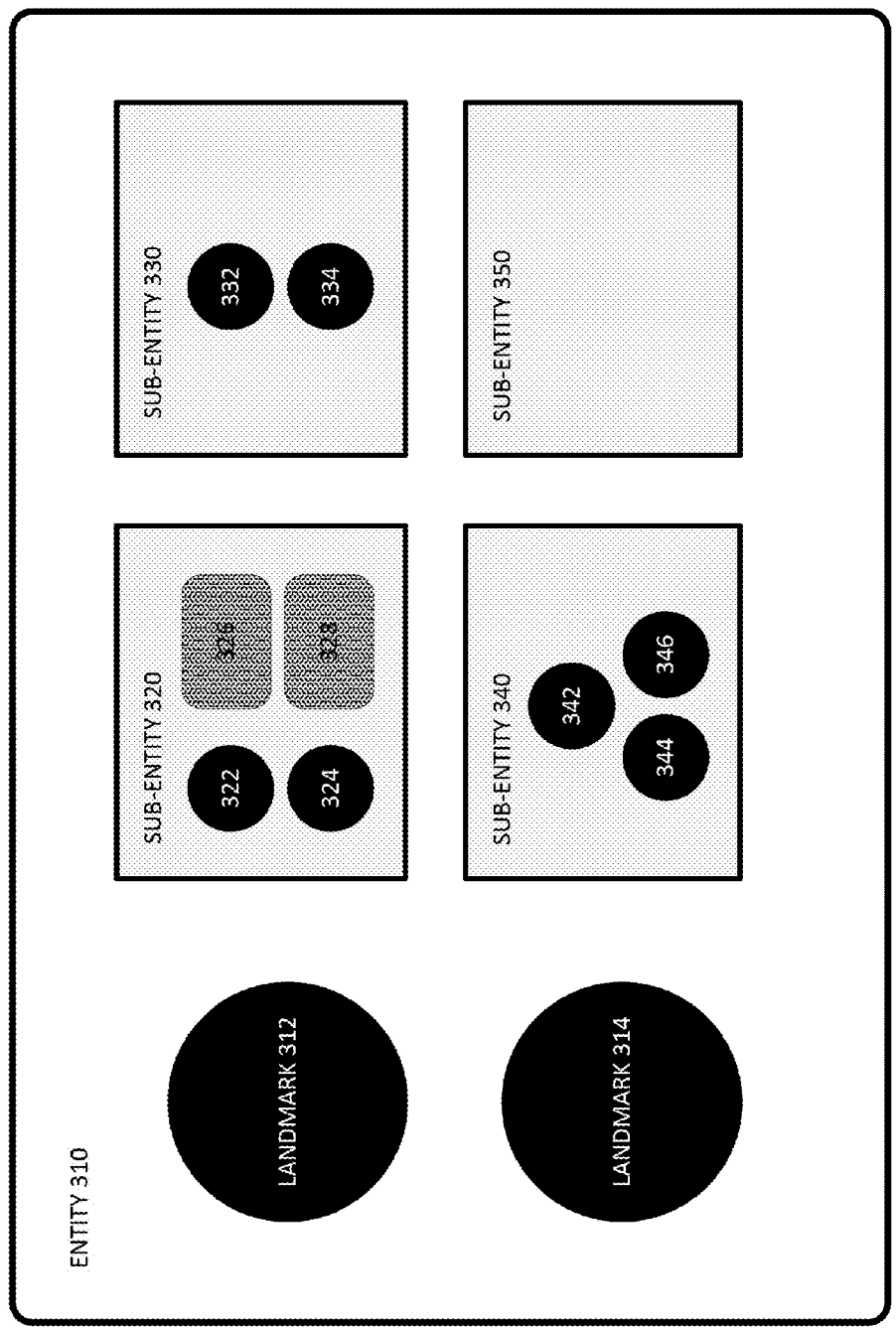
FIG. 3 is an example representation of a knowledge graph in accordance with aspects of the disclosure.

In order to generate a semantic image navigation experience, a first entity may be selected. A knowledge graph may be used to identify such an entity. For example, FIG. 3 is an example of a knowledge graph 300 including an entity 310. Entity 310 may be select as a first entity, automatically by a computing device generating semantic image navigation experiences that will be stored for later provision to users and/or in response to a request for a semantic image navigation experience of a particular entity.

One or more sub-entities of the first entity may then be identified by using the knowledge graph. As depicted in FIG. 3, first entity 310 is a parent entity to sub-entities 320, 330, 326, 328, 340 and 350. Sub-entities 320, 330, 326, 328, 340, 350 may form a set of sub-entities.

Any landmarks associated with the first entity and the sub-entities may also be identified using the knowledge graph. In FIG. 3, landmarks 312, 314 are associated with first entity 310; landmarks 322, 324 with sub-entity 320; landmarks 332, 334 with sub-entity 330; and landmarks 342, 344, 346 with sub-entity 340. Sub-entities 326, 328, 350 do not have associated landmarks. In this example, all or some of the entities in the knowledge graph may be geographic entities and, in some cases, geographic sub-entities having geographic containment relationships with geographic parent entities.

Figure 4:
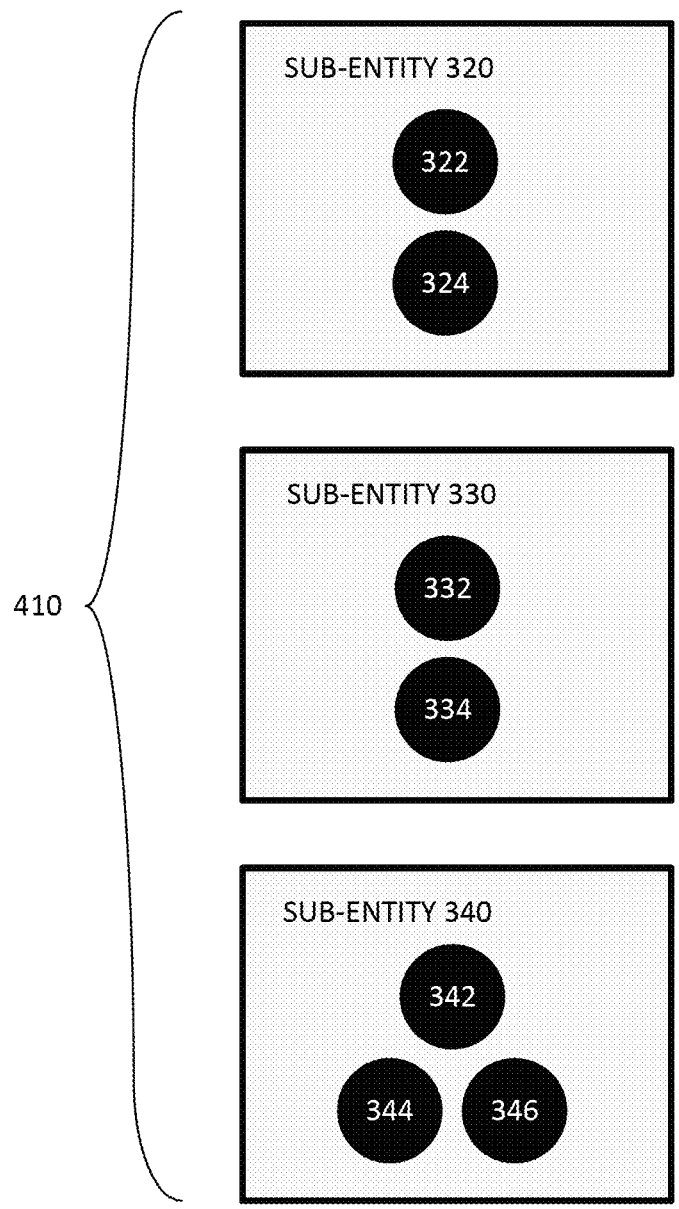
FIG. 4 is an example representation of a filtered set of entities in accordance with aspects of the disclosure.

The set of sub-entities may be filtered to remove any entities that do not have an associated landmark and a pre-stored navigation experience. Returning to the example of FIG. 3, sub-entities 326, 328, 350 do not have any associated landmarks nor do they have any associated navigation experiences. Thus, these sub-entities are removed from the set of entities. FIG. 4 is an example of a filtered set of sub-entities 400. In this example, only sub-entities 320, 330, 340 are in the filtered set of entities.

The sub-entities in the filtered set of sub-entities may be ranked and placed in an order based on the ranking. The ranking may be based on one or more landmark popularity metrics. In one example, the popularity metric may include a number of unique sources of images for a landmark. An alternative is to base the ranking on tourist attraction scores for the entities of the filtered set. Yet another alternative is to rank the entities based on location information from users. Returning to the example of FIG. 4, ranking order 410 places sub-entity 320 first, followed by sub-entity 330, then sub-entity 340.

Based on the ranking order, a subset of sub-entities may be selected from the filtered set of sub-entities. The subset may consist of a predetermined number of the top-ranked sub-entities. For example, if the predetermined number is 3, and there are ten (10) sub-entities in the filtered set, ranked from number 1 being the highest rank to 10 being the lowest, sub-entities numbers 1, 2, and 3 may be selected.

From at least the pre-stored navigation experiences associated with the subset of sub-entities, a semantic image navigation experience may be created for the first entity. First, a first group of images from the pre-stored navigation experiences of the subset of sub-entities may be selected. The group may consist of a predetermined number of images, such as three (or more or less). Groups from different pre-stored navigation experiences may consist of the same or different number of images. In some embodiments, the images may be selected from the beginning of the pre-stored navigation experiences.

Figure 5:
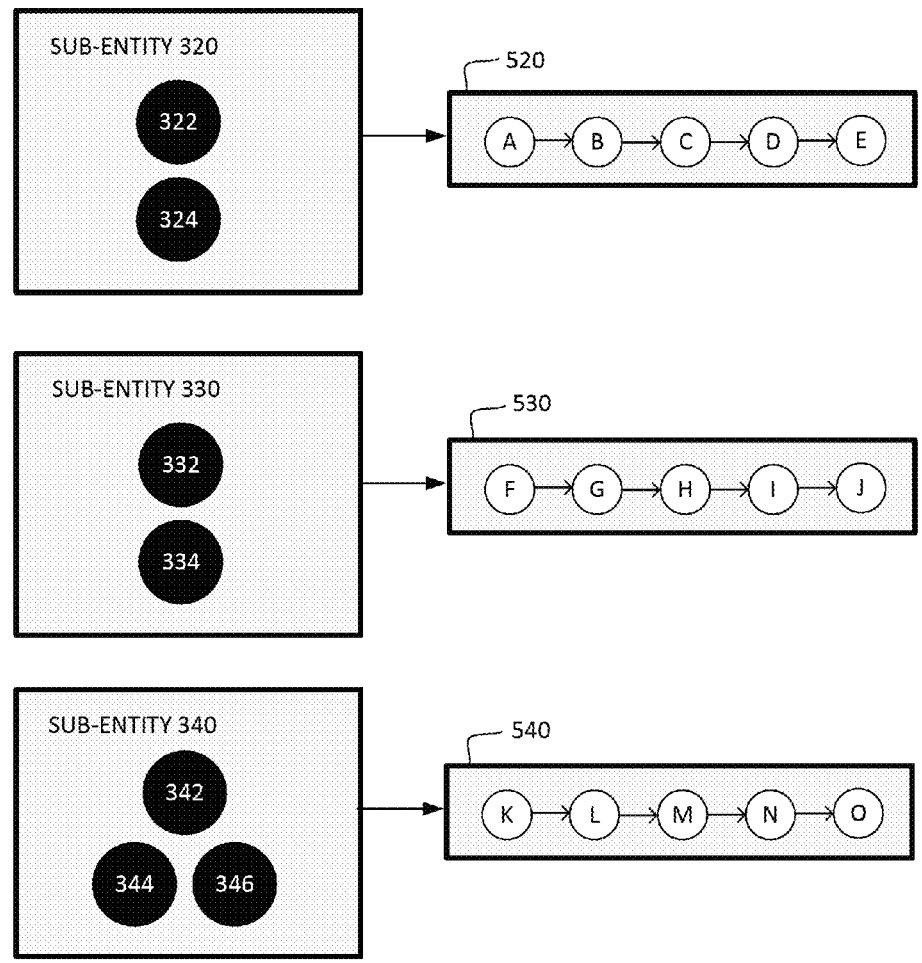
FIG. 5 is a representation of filtered set of sub-entities and associated pre-stored navigation experiences in accordance with aspects of the disclosure.

For example, first entity 310 and sub-entities 320, 330, 340 each have a pre-stored navigation experience. FIG. 5 is an example 500 of a filtered set of sub-entities and associated pre-stored navigation experiences. As shown in FIG. 5, sub-entity 320 is associated with pre-stored navigation experience 520, which contains images A, B, C, D, and E and transitions between them. Similarly, sub-entity 330 is associated with pre-stored navigation experience 530 comprising images F, G, H, I, and J, and sub-entity 340 with pre-stored navigation experience 540 comprising images K, L, M, N, and O. In one embodiment, the first three images A, B, C from the pre-stored navigation experience 520 of sub-entity 320, the first three images F, G, H from the pre-stored navigation experience 530 of sub-entity 330, and the first three images K, L, M of navigation experience 540 for sub-entity 340 may be selected.

Once selected, the groups of images from the pre-stored navigation experience may be organized into a sequence of images based on the ranking of the respective sub-entity to create a semantic image navigation system. The sequence may begin with the group of images from the pre-stored navigation experience associated with the top-ranked sub-entity, followed by the group of images from the pre-stored navigation experience associated with the next-ranked sub-entity, and so on. For example, because sub-entity 320 is ranked first in ranking order 410, images A, B, C from pre-stored navigation experience 520 may be at the beginning of the sequence for a semantic image navigation experience for first entity 310. Next, images F, G, H from pre-stored navigation experience 530 of sub-entity 330 may follow, since sub-entity 330 comes after sub-entity 320 in ranking order 410. Images K, L, M may follow thereafter.

Figure 6:
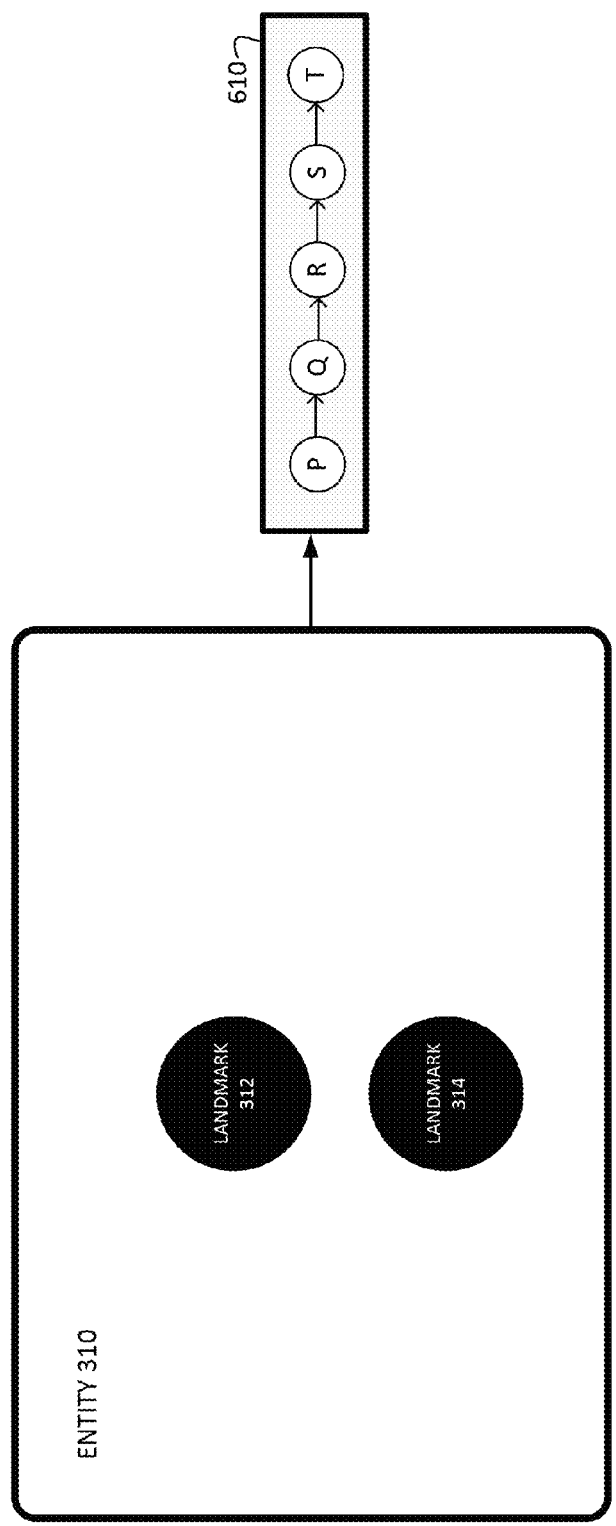
FIG. 6 is an example representation of an entity and an associated pre-stored navigation experience in accordance with aspects of the disclosure.

In some embodiments, if the first entity is associated with a pre-stored navigation experience, a group of images from that pre-stored navigation experience may be inserted into the sequence for the semantic image navigation experience. The group may constitute a predetermined number of images that may or may not be the same number of images in the groups of images associated with the subset of sub-entities. The group of images may be inserted at the beginning of the sequence. For example, as shown in example 600 of FIG. 6, first entity 310 is associated with a pre-stored navigation experience 610, which contains images P, Q, R, S, and T. Image P, Q, R may be selected and inserted at the beginning of the sequence comprising images from navigation experiences 520, 530, 540 described above.

Figure 7:
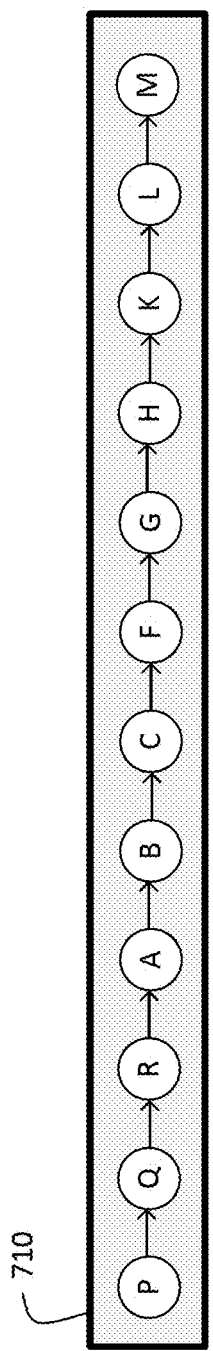
FIG. 7 is an example representation of an image navigation experience in accordance with aspects of the disclosure.

The resulting sequence of images coupled with information for displaying the images as a photo tour may be a semantic image navigation experience for the first entity. Additionally, the information that was included in the pre-stored navigation experiences may be included in the semantic image navigation experience for the first entity. For example, semantic image navigation experience 710 for first entity 310 may include information from navigation experiences 520, 530, 540, 610. The semantic image navigation experiences for respective entities may be stored. FIG. 7 is an example 700 of a semantic image navigation experience for the first entity 310. As depicted in FIG. 7, the semantic image navigation experience 710 includes a sequence of images assembled in the order described above—P, Q, R, A, B, C, F, G, H, K, L, M. Semantic image navigation experience 710 may be stored on storage system 150 and associated with first entity 310 in the knowledge graph.

A user may use a client computing device to request and view the semantic image navigation experiences. For example, a user 220, 230, 240 may enter a request identifying entity 310. In response, a semantic image navigation experience 710 may be sent to the client device 120, 130, 140 for display. Information and instructions included in the semantic image navigation experience 710 may also be sent to be displayed alongside the images on the user device 120, 130, 140.

Figure 8:
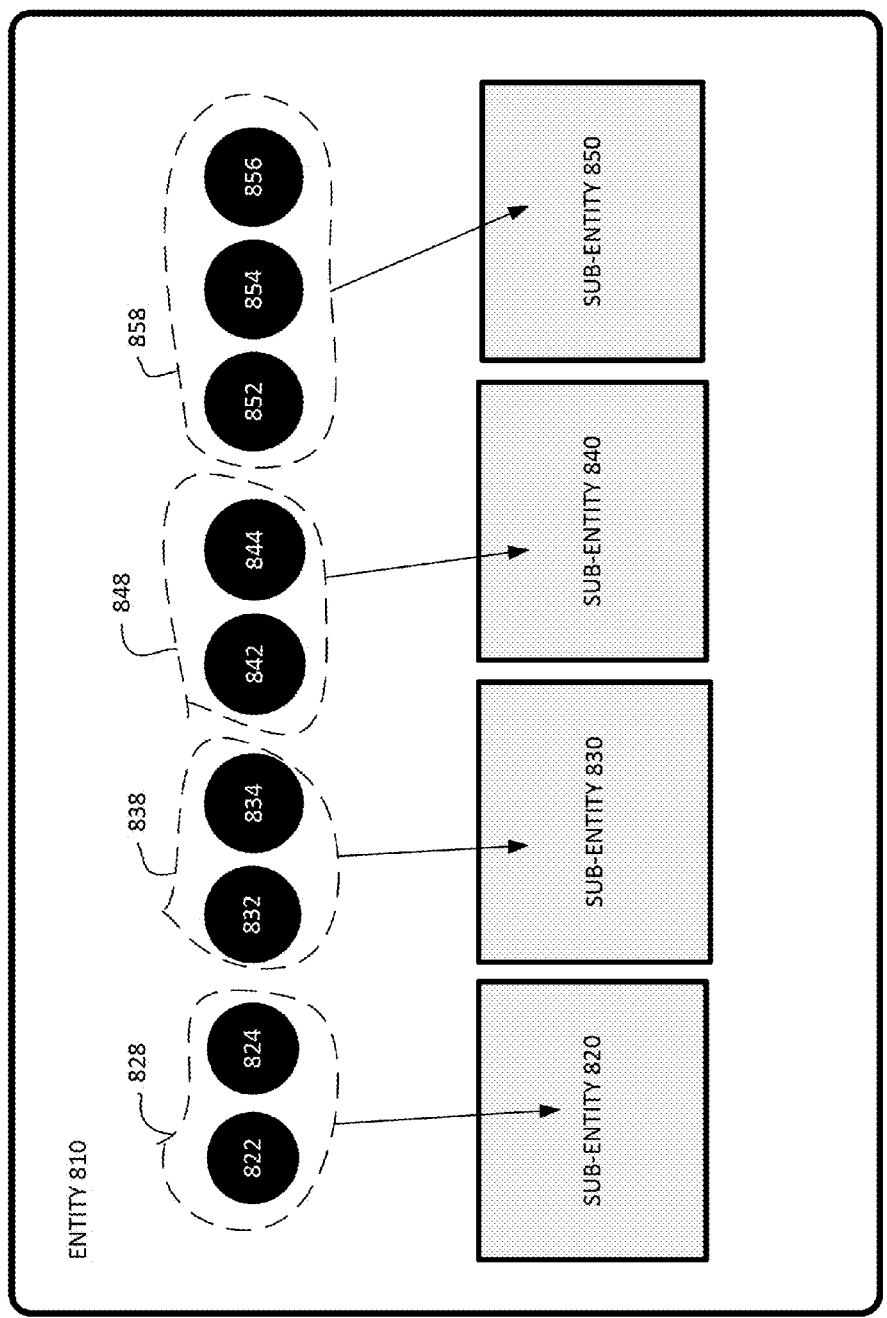
FIG. 8 is an example representation of another knowledge graph in accordance with aspects of the disclosure.

In another embodiment, a navigation experience may be created for an entity associated with sub-entities that are not associated with any landmarks, though the entity may be associated with one or more landmarks. FIG. 8 is an example of a knowledge graph 800. In this example, knowledge graph 800 stores entity 810. Entity 810 has sub-entities 820, 830, 840, 850 and landmarks 822, 824, 832, 834, 842, 844, 852, 854, 856. Sub-entities 820, 830, 840, 850 are not associated with any landmarks.

The one or more landmarks for the entity may be segmented into clusters of landmarks based on different features. This may be accomplished through use of a clustering technique which may consider information such as what features are of importance within an entity. For instance, the nine landmarks associated with entity 810 may form four clusters 828, 838, 848, 858. If entity 810 was the "Pantheon" entity, cluster 828 may contain visual representations of the portico, cluster 838 visual representations of the rotunda, cluster 848 visual representations of the artwork, and cluster 858 visual representations of Raphael's tomb.

Then, each cluster of landmarks may be associated with the respective sub-entity, after which a semantic image navigation experience may be created as described above. Cluster 828 containing the visual representations of the portico of the Pantheon, for example, may be associated with the "portico of the Pantheon" entity 820. The resulting semantic image navigation experience may flow in a more logical manner than if the landmarks were not first clustered and associated with respective sub-entities. In other embodiments, one or more images may first be clustered to define respective landmarks before the landmarks are clustered.

Figure 9:
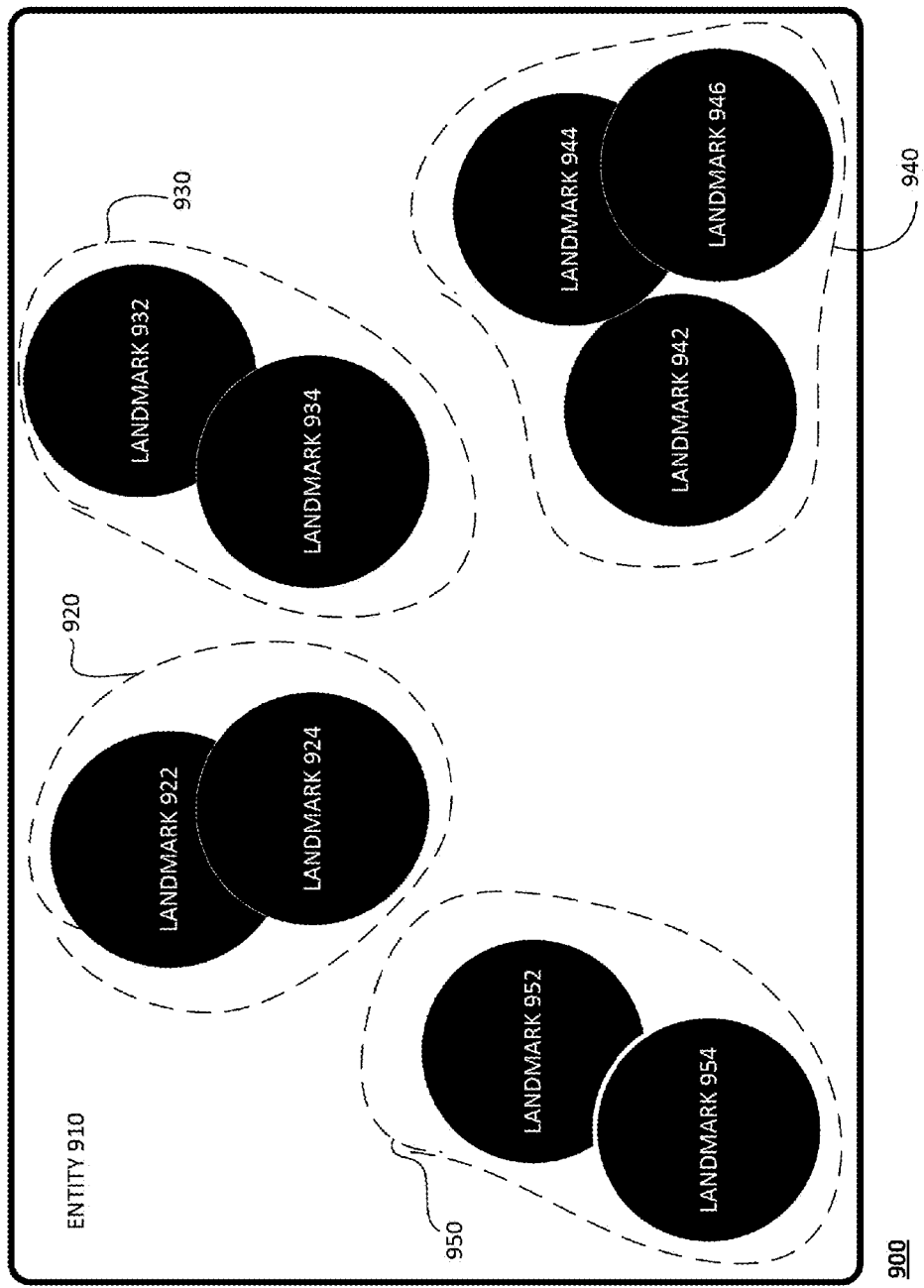
FIG. 9 is an example representation of an entity in accordance with aspects of the disclosure.

In other embodiments, a navigation experience may be created for an entity with no pre-defined sub-entities. In order to do so, the landmarks may be treated as sub-entities and clustered together. FIG. 9 is an example 900 of an entity 910 having a plurality of landmarks 922, 924, 932, 934, 942, 944, 946, 952, 954. These landmarks may be segmented into clusters of landmarks 920, 930, 940, 950 based on different features. This segmenting and clustering may be accomplished through use of a clustering technique that consider information such as what features are of importance within an entity. The entity 910 may then be treated as a first entity, and the clusters of landmarks as sub-entities. A semantic image navigation experience may be created for entity 910 by ranking the landmarks and selecting images from associated pre-stored navigation experiences in the manner described above. The resulting semantic image navigation experience may flow in a more logical manner than if the landmarks were not first clustered and treated as sub-entities. In yet another embodiment, a navigation experience may be created for an entity without predefined sub-entities or landmarks, where one or more images may first be clustered to define respective landmarks.

Figure 10:
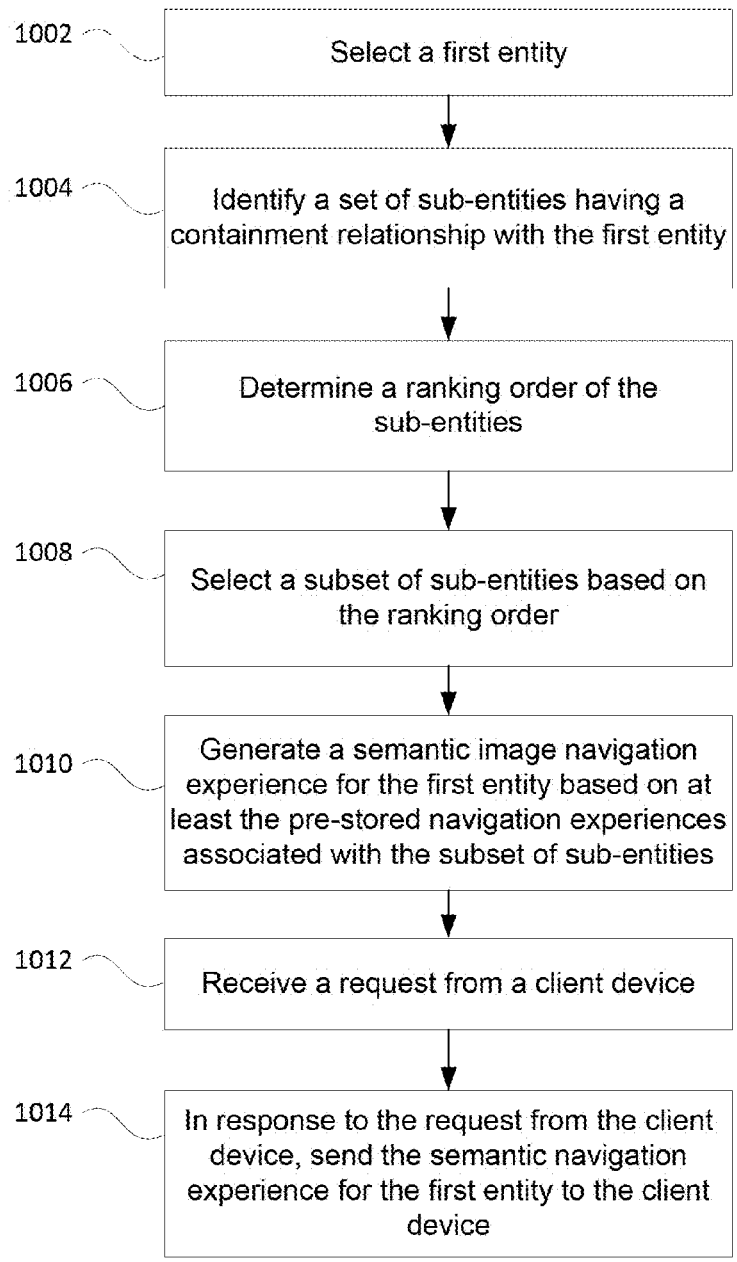
FIG. 10 is an example flow diagram in accordance with aspects of the disclosure.

FIG. 10 is an example flow diagram 1000 in accordance with some aspects described above that may be performed by one or more computing devices such as server computing devices 110. In one embodiment, a first entity is selected at block 1002. Then, a set of sub-entities having a containment relationship with the first entity is identified at block 1004. A ranking order of the sub-entities in the set of sub-entities is determined at block 1006. Based on the ranking order, a subset of sub-entities is selected at block 1008. Then, based on at least the pre-stored navigation experiences associated with the subset of sub-entities, a semantic image navigation experience for the first entity is generated. A request from a client device may be received at block 1012, in response to which the semantic image navigation experience for the first entity is sent to the client device at block 1014.

The features described above may allow users to view more meaningful and comprehensive navigation experiences of different entities. For example, a semantic image navigation experience of an entity may include landmarks of the entity as well as landmarks of its sub-entities. For entities that do not have any directly associated landmarks, such as entities that may be too large to be photographed in their entirety, a semantic image navigation experience may contain a sequence of images of landmarks of the sub-entities that are contained within the larger entity. In addition, for a particular entity with no pre-defined sub-entities, the flow of its navigation experience may be improved to show one feature of the entity at a time in an order based on their ranking.

The invention claimed is:

1. A method for generating semantic image navigation experiences, the method comprising:
   selecting, by one or more computing devices, a first geographic entity of a plurality of distinct geographic entities;
   identifying, by the one or more computing devices, a plurality of distinct geographic sub-entities, each distinct geographic sub-entity having a geographic containment relationship with the first geographic entity, the plurality of distinct geographic sub-entities including:
      a first distinct geographic sub-entity that is both (i) visually represented by at least one landmark corresponding to the first distinct geographic sub-entity and (ii) associated with a pre-stored navigation experience of a plurality of pre-stored navigation experiences that is unique to the first distinct geographic sub-entity, and
      a second distinct geographic sub-entity that is not at least one of (i) visually represented by at least one landmark corresponding to the second distinct geographic sub-entity and (ii) associated with a pre-stored navigation experience of the plurality of pre-stored navigation experiences that is unique to the second distinct geographic sub-entity,
      wherein each pre-stored navigation experience in the plurality of pre-stored navigation experiences corresponds to a given geographic entity and comprises a sequence of images and transitions between the images that produces a tour of at least one landmark associated with the given geographic entity;
   filtering, by the one or more computing devices, the plurality of distinct geographic sub-entities to remove at least one distinct geographic sub-entity that is not at least one of (i) visually represented by at least one landmark and (ii) associated with a pre-stored navigation experience of the plurality of pre-stored navigation experiences that is unique to the at least one distinct geographic sub-entity, the at least one distinct geographic sub-entity including the second geographic sub-entity;
   determining, by the one or more computing devices, a ranking order of the filtered plurality of distinct geographic sub-entities based at least in part on one or more characteristics of each distinct geographic sub-entity in the filtered plurality of distinct geographic sub-entities;
   selecting, by one or more computing devices, a subset of at least two distinct geographic sub-entities based on the ranking order; and
   generating, by the one or more computing devices, a semantic image navigation experience for the first geographic entity based on at least the pre-stored navigation experiences associated with the subset of at least two distinct geographic sub-entities by:
      automatically selecting a plurality of images from each pre-stored navigation experience of the subset of at least two distinct geographic sub-entities, and
      including the plurality of selected images in the semantic image navigation experience as a sequence of images based on the ranking order.

2. The method of claim 1, further comprising:
   receiving, by the one or more computing devices, a request from a client computing device; and
   sending, in response to the request, by the one or more computing devices, the semantic image navigation experience for the first geographic entity to the client computing device.

3. The method of claim 1, wherein generating the semantic image navigation experience further comprises:
   selecting, by the one or more computing devices, a set of images from a pre-stored navigation experience for the first geographic entity; and
   inserting, by the one or more computing devices, the set of images from the pre-stored navigation experience for the first geographic entity at a beginning of the semantic image navigation experience for the first geographic entity.

4. The method of claim 1, wherein determining the ranking order is based on at least a landmark popularity metric.

5. The method of claim 1, wherein identifying the plurality of distinct geographic sub-entities further comprises:
   clustering, by the one or more computing devices, a set of images of the first geographic entity into subsets of images based on at least common features found in the images in the set of images; and
   defining, by the one or more computing devices, each subset of images as landmarks of a geographic sub-entity of the first geographic entity.

6. The method of claim 1, wherein generating the semantic image navigation experience further comprises including information about each distinct geographic sub-entity in the subset of at least two distinct geographic sub-entities.

7. The method of claim 1, further comprising:
   clustering, by the one or more computing devices, at least two landmarks that visually represent the first geographic entity into a group;
   defining, by the one or more computing devices, the group of the at least two landmarks as a third distinct geographic sub-entity of the plurality of distinct geographic sub-entities.

8. A system comprising one or more computing devices configured to:
   select a first geographic entity of a plurality of distinct geographic entities;
   identify a plurality of distinct geographic sub-entities, each distinct geographic sub-entity having a geographic containment relationship with the first geographic entity, the plurality of distinct geographic sub-entities including:
  a first distinct geographic sub-entity that is both (i) visually represented by at least one landmark corresponding to the first distinct geographic sub-entity and (ii) associated with a pre-stored navigation experience of a plurality of pre-stored navigation experiences that is unique to the first distinct geographic sub-entity, and
  a second distinct geographic sub-entity that is not at least one of (i) visually represented by at least one landmark corresponding to the second distinct geographic sub-entity and (ii) associated with a pre-stored navigation experience of the plurality of pre-stored navigation experiences that is unique to the second distinct geographic sub-entity,
  wherein each pre-stored navigation experience in the plurality of pre-stored navigation experiences corresponds to a given geographic entity and comprises a sequence of images and transitions between the images that produces a tour of at least one landmark associated with the given geographic entity;
filter the plurality of distinct geographic sub-entities to remove at least one distinct geographic sub-entity that is not at least one of (i) visually represented by at least one landmark and (ii) associated with a pre-stored navigation experience of the plurality of pre-stored navigation experiences that is unique to the at least one distinct geographic sub-entity, the at least one distinct geographic sub-entity including the second geographic sub-entity;
determine a ranking order of the filtered plurality of distinct geographic sub-entities based at least in part on one or more characteristics of each distinct geographic sub-entity in the filtered plurality of distinct geographic sub-entities;
select a subset of at least two distinct geographic sub-entities based on the ranking order; and
generate a semantic image navigation experience for the first geographic entity based on at least the pre-stored navigation experiences associated with the subset of at least two distinct geographic sub-entities by:
  automatically selecting a plurality of images from each pre-stored navigation experience of the subset of at least two distinct geographic sub-entities, and
  including the plurality of selected images in the semantic image navigation experience as a sequence of images based on the ranking order.

9. The system of claim 8, wherein the one or more computing devices are further configured to:
  receive a request from a client computing device; and
  send, in response to the request, the semantic image navigation experience for the first geographic entity to the client computing device.

10. The system of claim 8, wherein the one or more computing devices are further configured to generate the semantic image navigation experience by:
  selecting a set of images from a pre-stored navigation experience for the first geographic entity; and
  inserting the set of images from the pre-stored navigation experience for the first geographic entity at a beginning of the semantic image navigation experience for the first geographic entity.

11. The system of claim 8, wherein the ranking order is determined based on at least a landmark popularity metric.

12. The system of claim 8, wherein the one or more computing devices are further configured to generate the semantic image navigation experience by including information about each distinct geographic sub-entity in the subset of at least two distinct geographic sub-entities.

13. The system of claim 8, wherein the one or more computing devices are further configured to identify the plurality of distinct geographic sub-entities by:
  clustering a set of images of the first geographic entity into subsets of images based on at least common features found in the images in the set of images; and
  defining each subset of images as landmarks of a geographic sub-entity of the first geographic entity.

14. The system of claim 8, wherein the one or more computing devices are further configured to:
  cluster at least two landmarks that visually represent the first geographic entity into a group;
  define the group of the at least two landmarks as a third distinct geographic sub-entity of the plurality of distinct geographic sub-entities.

15. A non-transitory, tangible machine readable medium on which instructions are stored, the instructions, when executed by one or more processors, cause the one or more processors to perform a method, the method comprising:
  selecting a first geographic entity of a plurality of distinct geographic entities;
  identifying a plurality of distinct geographic sub-entities, each distinct geographic sub-entity having a geographic containment relationship with the first geographic entity, the plurality of distinct geographic sub-entities including:
    a first distinct geographic sub-entity that is both (i) visually represented by at least one landmark corresponding to the first distinct geographic sub-entity and (ii) associated with a pre-stored navigation experience of a plurality of pre-stored navigation experiences that is unique to the first distinct geographic sub-entity, and
    a second distinct geographic sub-entity that is not at least one of (i) visually represented by at least one landmark corresponding to the second distinct geographic sub-entity and (ii) associated with a pre-stored navigation experience of the plurality of pre-stored navigation experiences that is unique to the second distinct geographic sub-entity,
    wherein each pre-stored navigation experience in the plurality of pre-stored navigation experiences corresponds to a given geographic entity and comprises a sequence of images and transitions between the images that produces a tour of at least one landmark associated with the given geographic entity;
  filtering the plurality of distinct geographic sub-entities to remove at least one distinct geographic sub-entity that is not at least one of (i) visually represented by at least one landmark and (ii) associated with a pre-stored navigation experience of the plurality of pre-stored navigation experiences that is unique to the at least one distinct geographic sub-entity, the at least one distinct geographic sub-entity including the second geographic sub-entity;
  determining a ranking order of the filtered plurality of distinct geographic sub-entities based at least in part on one or more characteristics of each distinct geographic sub-entity in the filtered plurality of distinct geographic sub-entities;
  selecting a subset of at least two distinct geographic sub-entities based on the ranking order; and generating a semantic image navigation experience for the first geographic entity based on at least the pre-stored navigation experiences associated with the subset of at least two distinct geographic sub-entities by:
    automatically selecting a plurality of images from each pre-stored navigation experience of the subset of at least two distinct geographic sub-entities, and
    including the plurality of selected images in the semantic image navigation experience as a sequence of images based on the ranking order.

16. The medium of claim 15, wherein the method further comprises:
    receiving a request from a client computing device; and
    sending, in response to the request, the semantic image navigation experience for the first geographic entity to the client computing device.

17. The medium of claim 15, wherein the method further comprises generating the semantic image navigation experience by:
    selecting a set of images from a pre-stored navigation experience for the first geographic entity; and
    inserting the set of images from the pre-stored navigation experience for the first geographic entity at a beginning of the semantic image navigation experience for the first geographic entity.

18. The medium of claim 15, wherein the method further comprises generating the semantic image navigation experience by including information about each distinct geographic sub-entity in the subset of at least two distinct geographic sub-entities.

19. The medium of claim 15, wherein the method further comprises identifying the plurality of distinct geographic sub-entities by:
    clustering a set of images of the first geographic entity into subsets of images based on at least common features found in the images in the set of images; and
    defining each subset of images as landmarks of a geographic sub-entity of the geographic first entity.

20. The medium of claim 15, wherein the method further comprises:
    clustering at least two landmarks that visually represent the first geographic entity into a group;
    defining the group of the at least two landmarks as a third distinct geographic sub-entity of the plurality of distinct geographic sub-entities.

* * * * *